Figure 1:
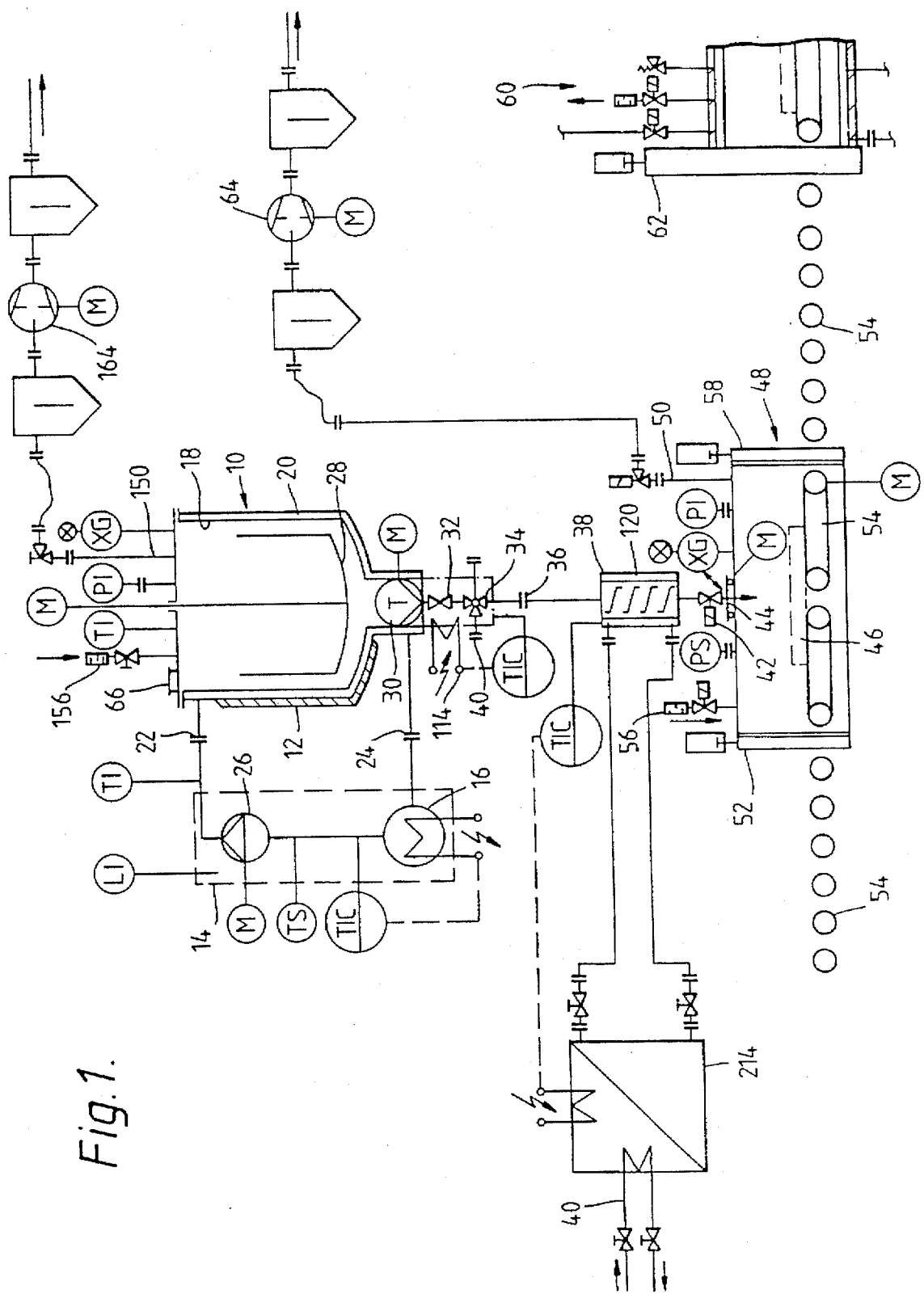

United States Patent

Terhardt et al.

[11] Patent Number: 5,670,203
[45] Date of Patent: Sep. 23, 1997

[54] PROCESS FOR POTTING COMPONENTS IN AN IMPREGNATING COMPOUND

[75] Inventors: Josef Terhardt, Rhede-Vardingholt; Peter Ruger, Bocholt, both of Germany; Dieter Baumann, Mohlin, Switzerland

[73] Assignees: Ver-Fahrenstechnik Hubers GmbH, Bocholt; Ciba-Geigy Aktiengesellschaft, Basel, Switzerland

[21] Appl. No.: 307,819

[22] PCT Filed: Mar. 19, 1993

[86] PCT No.: PCT/EP93/00663

§ 371 Date: Dec. 9, 1994

§ 102(e) Date: Dec. 9, 1994

[87] PCT Pub. No.: WO93/19919

PCT Pub. Date: Oct. 14, 1993

[30] Foreign Application Priority Data

Mar. 28, 1992 [DE] Germany ............ 42 10 241.3

[51] Int. Cl.[6] ............................................ B05D 5/12
[52] U.S. Cl. ................... 427/58; 427/294; 427/385.5; 118/50.1; 118/642
[58] Field of Search .................. 427/58, 294, 385.5; 118/50.1, 642

[56] References Cited

U.S. PATENT DOCUMENTS

| 3,383,565 | 5/1968 | Gritton | 317/101 |
|---|---|---|---|
| 3,747,037 | 7/1973 | Earing | 336/96 |
| 4,160,178 | 7/1979 | Smith et al. | 310/43 |
| 4,311,739 | 1/1982 | Hardman et al. | 427/387 |
| 4,756,091 | 7/1988 | Van Denend | 34/4 |
| 4,892,764 | 1/1990 | Drain et al. | 428/34.5 |
| 5,044,944 | 9/1991 | Furuya et al. | 432/128 |
| 5,057,348 | 10/1991 | Drain et al. | 428/76 |
| 5,157,820 | 10/1992 | Frederick | 29/25.42 |

FOREIGN PATENT DOCUMENTS

| 3019509 | 11/1981 | Germany | B01J 4/02 |
|---|---|---|---|
| 3803419 | 5/1993 | Germany | B29C 31/06 |

*Primary Examiner*—Benjamin Utech
*Attorney, Agent, or Firm*—Sprung Horn Kramer & Woods

[57] ABSTRACT

Method and apparatus for potting components in an impregnating composition which does not set at room temperature, but which sets at elevated temperatures in a short time. A one-component composition is used. The potting chamber optionally consists of a forechamber, a main chamber and an exit chamber. The potting chamber is followed by a tunnel oven which itself consists of an airlock entry chamber, a main chamber and an airlock exit chamber.

16 Claims, 4 Drawing Sheets

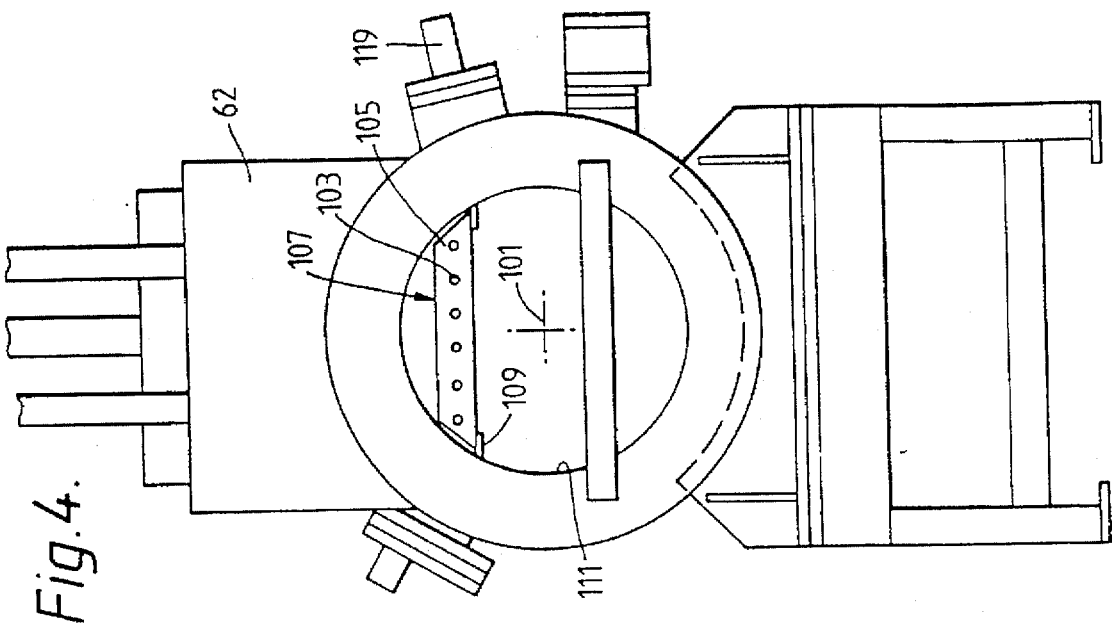
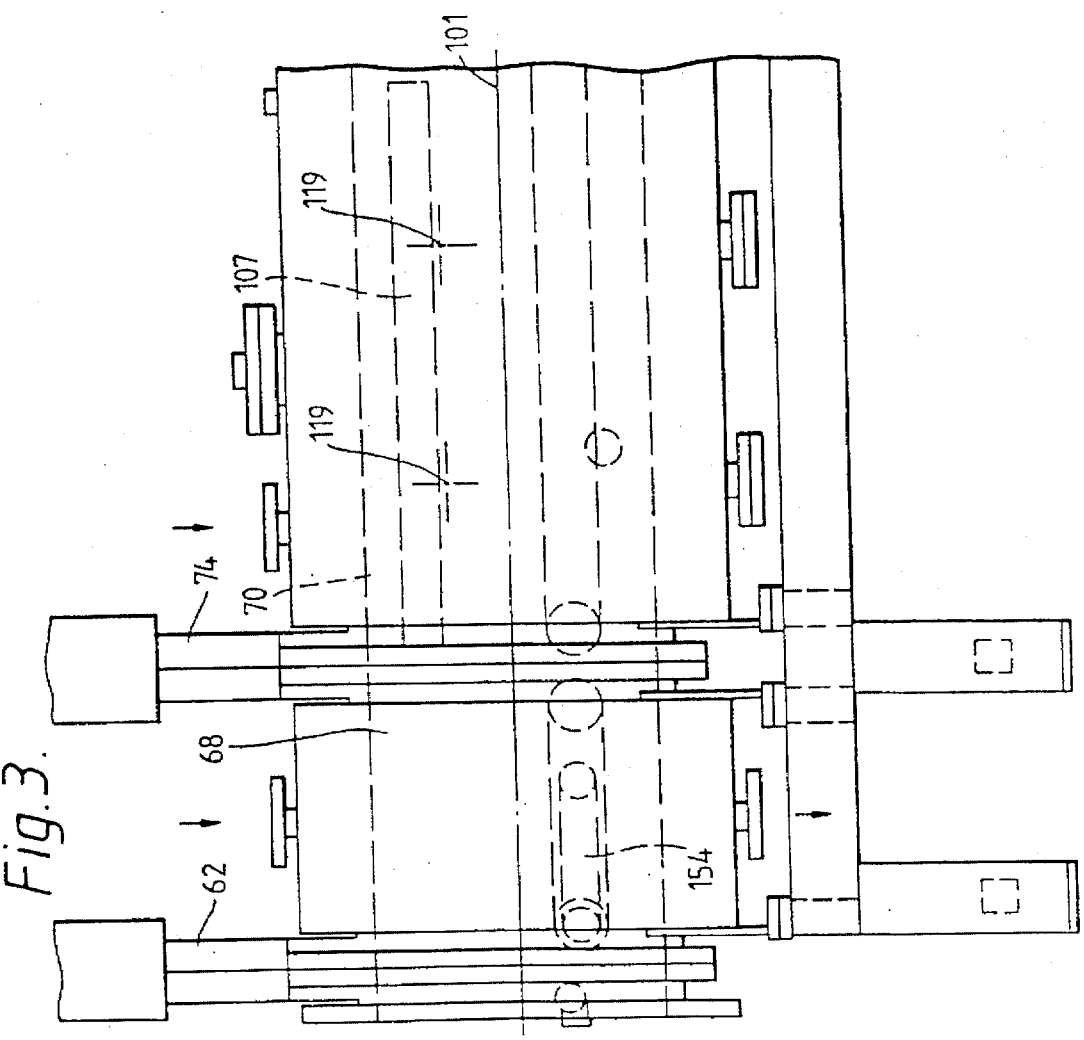

PROCESS FOR POTTING COMPONENTS IN AN IMPREGNATING COMPOUND

FIELD

The invention relates to a process for potting components in an impregnating composition which does not set at room temperature but which at elevated temperature (e.g. 60° to 80° C.) sets in a short time (e.g., in less than 30 minutes).

The invention furthermore relates to an apparatus for the practice of the method, consisting of a holding tank for a potting composition, a feeder connected to the holding tank, which discharges within a preferably evacuated potting chamber above the component or components to be potted; a transport system carrying through the potting chamber the component or the components disposed, for example, on a pallet, while the potting chamber is a single chamber or comprises three treatment chambers formed by dividing walls, a forechamber or first chamber for entrance through an airlock, a main chamber for potting, and an output chamber for output through an airlock.

STATE OF THE ART

In a printed publication of Verfahrenstechnik Hübers GmbH, 4290 Bocholt, entitled "Vakuumgießharzanlagen," on page 9 a three-chamber automatic potting machine is described, in which, in addition to the main chamber in which the potting composition is cured in a vacuum by heat treatment, still another chamber is provided for the preliminary treatment and for admitting through an airlock the molds situated on a pallet, and an additional airlock chamber for the discharge and after-treatment of the potted components.

The individual chambers are connected together by vacuum-tight vertically sliding gates, so that the potting chamber located in the center does not have to be vented after the process has ended and then re-evacuated.

This time-saving procedure permits very large numbers of units to be potted all automatically through single and multiple potting spouts.

This shows clearly that the use of three-chamber vacuum ovens in itself pertains to the state of the art, even though details are not to be found in this publication.

It is the aim of the present invention to improve on this state of the art and especially to use it for modified methods of procedure.

In addition, mention is to be made of printed disclosures which likewise originate with the applicant and which deal with some aspects of the present invention. Thus, DE 38 03 419 A1 shows an apparatus for the metered dispensing of a plurality of portions of viscous substances, such as potting resin, in which potting apparatus are disposed also within a vacuum or subatmospheric pressure chamber above containers for receiving the portions of viscous substances. Nothing, however, is stated in this disclosure about the further treatment. In the disclosure additional disclosures are named as state of the art, but they tell nothing, either, about the further process after the dispensing and the potting of components.

A vacuum chamber used for potting is shown with special clarity in DE 30 19 509 A1 in which a precursor type of the potting apparatus represented in the prospectus referred to above is explained. Attention is called to these disclosures, therefore, in regard to details of the potting process, so that there is no need for any further explanation thereof in the following description.

It is common to all of the said disclosures that a two-component material is used, which is hardened by putting the two components in contact with one another. Lately, however, efforts have been made to develop potting compositions which are ready-mixed, so that the necessity of dispensing the individual components or ingredients of the mixture can be eliminated, resulting in considerable simplification.

The use of single-component material, however, has resulted not just in simplifications because of eliminating the arrangement of several holding tanks, and the setting up of apparatus for the precise metering and mixing of the materials; another advantage is that such a single-component material is less toxic, in contrast to the formerly used multi-component materials in which one of the components is comparatively very toxic before it is processed.

Single-component materials do not have these disadvantages. They can possibly also be so formulated that they set in a relatively short time (e.g., within a quarter-hour) when heated, whereas formerly a setting cycle of as much as 6 hours was common. Another advantage that is to be achieved is a reduction in the size of the machinery if only because one holding tank is required instead of several. Also, energy consumption can be reduced because no longer do several holding tanks have to be held at a specific temperature, but only a single holding tank, which can be kept at room temperature, so that here again, precise temperature control can possibly be eliminated.

It is true that a new material of this kind also requires new equipment with which the material can be processed.

The method to be described hereinafter, and the apparatus to be provided for the practice of the method, permit the processing of a material, usually of high viscosity, which is not reactive at temperatures up to 30° C. but usually begins to set at higher temperatures, e.g., 80° C., and then becomes completely set within a short time.

On account of the very short setting time, of for example only 15 minutes, which is desirable with such material, certain objects, such as horizontal output transformers in the television industry, which have to be thoroughly impregnated, can no longer be treated by former processes (vacuum production, casting, venting, curing in a drying oven, e.g., a paternoster oven) because the total period of time required for these procedures with the new material is no longer available. Furthermore, the paternoster ovens used heretofore are not only bulky but they consume a great amount of energy.

With the new method it is to be brought about that the formerly required amount of time will be drastically reduced, thus achieving the desired adaptation to the new material.

The purpose of the invention is achieved by a method of procedure involving the following steps:

a) Introduction of a component or a pallet of a plurality of components into a potting chamber which can be evacuated.

b) Evacuation of the potting chamber.

c) Potting the one or more components—successively if desired—in the composition under reduced pressure or a vacuum.

d) Venting the potting chamber.

e) Removing the component or pallet of components and bringing them into an airlock of a curing oven.

f) Closing the curing oven airlock and evacuating the forechamber.

g) Opening the oven airlock forechamber to an oven main chamber, introducing the component or pallet of components into the oven main chamber, closing the oven main chamber.

h) Passing the component or pallet of components through the oven main chamber, together, if desired, with other components or other pallets of components, in step with the entry of additional components or pallets of components into the oven airlock forechamber and into the oven main chamber.

i) Opening the oven main chamber to an oven airlock exit chamber and carrying the component or pallet of components out of the oven main chamber into the oven airlock exit chamber and closing the oven airlock exit chamber.

j) Venting the oven airlock exit chamber and removing the component or pallet of components from the oven airlock exit chamber.

By this procedure it is brought about that even with the above-explained single-component composition a sufficiently good impregnation even of critical components, such as horizontal output transformers in the television industry, becomes possible, and this within a sufficiently brief time, so that even fast-setting single-component potting material is able to penetrate into all pores and winding gaps in the component, so that no voids tending to produce flashovers, for example, will remain.

By the use of forechambers, main chambers and exit chambers within the oven apparatus the waiting time for individual components or pallets of components, after potting and up to entry into the oven and thus the return to normal pressure can be drastically reduced, to two or three minutes for example, so that the danger involved in earlier methods no longer exists, that the material might partially set during this waiting period. The danger that all of the pores and windings might not be filled with material during the subsequent venting in the oven is reduced. Because the period of time between the potting and the subsequent venting and possible subjection to elevated temperature is so brief that it amounts to only a fraction, or 10 to 20%, of the total time available for the curing process. This is sufficient to assure that even critical components will be sufficiently well impregnated.

An additional advantage of the treatment using forechamber, main chamber and exit chamber is that considerably less energy is consumed, and also the danger of releasing environmentally harmful gases is reduced.

The method of the invention can be still further developed, for example by performing the potting (process step c) by means of a heated extruding mixer which heats the composition by mixing it at just approximately the reaction temperature, so that a component or the pallet of components can be potted with it. With this heating the reaction event starts right during the mixing, so that the curing starts not just at the surface, as in former processes, but within the entire potting material, which permits a more uniform and synchronous cure, improving the quality of the finished components, and reduces the danger of shrinkage holes, i.e., shrinkage openings in the composition. As a result of the further procedure according to the invention, which leads, as already described, to a very brief, cyclic oven cure, this curing phase starting right in the mixer is without any disadvantages.

It is desirable if, in process step h, the passage through the main chamber of the oven takes place in synchronism with passage through the airlock forechamber and the airlock exit chamber. In particular, the hot compressed air in the chambers can be recycled with appropriate timing.

The efficiency of the apparatus can be increased if the air vented from the airlock chambers (forechamber and exit chamber) is recirculated.

In the apparatus for the practice of the method the invention consists in the fact that the potting chamber is followed by a tunnel oven for curing the composition in the components under elevated temperature and pressure, in which the transport system enters, passes through and comes back out again.

To achieve the short processing time it is advantageous if the oven, as already described, consists of three chambers, namely a forechamber, a main chamber and an exit chamber.

The time-saving ability to heat the composition while it is being mixed, which results in a more uniformly solidified product, can be achieved by connecting a heated static mixer to the output of the feeder system, which leads into the potting chamber through a potting valve.

The two airlock chambers of the curing oven can be connected to one another through a pressure line system permitting a (passive) venting of the one airlock chamber (e.g., the exit chamber) into the other airlock chamber (e.g., the forechamber).

This venting can be actively assisted by pumping systems, continuing until the one airlock chamber reaches the ambient pressure and the other airlock chamber reaches the pressure within the main chamber.

The chambers can be connected to heating systems which keep the chamber walls at a set temperature. They can consist of a hollow space enveloping the chamber walls, into one end of which heating medium is fed and at its other end heating medium is removed. This results in an especially energy-saving mode of operation.

Infrared radiators can advantageously be provided as heating means in addition to or instead of convection heating apparatus, their timed operation covering at least one surface of the mass to be cured. This is especially true when the components to be potted have comparatively large dimensions, such as horizontal output transformers for television receivers, for example.

Additional infrared heating is also useful if variations occur in the temperature of the components. For example, when the first component of a series of entering components does not have the same temperature as the last component. Such temperature variations can be compensated by infrared heating, which is especially easy if a pyrometer is provided to sense the temperature of this surface of the setting composition so that the infrared heaters can be controlled with special accuracy, and also adapt to varying component temperatures.

For this purpose infrared radiators and pyrometers could be interconnected by a control system, such as especially a microprocessor, to form a control circuit such that the surface (or surface layer) is heated to a given temperature within a given time and held at this temperature for another given mount of time. (The depth of penetration usually mounts to only a few tenths of a millimeter.)

The infrared radiator can preferably consist of a plurality of quartz tubes arranged side by side coaxial with the oven axis, the surface spanned by the quartz tube axes being substantially parallel to the distance from the surface of the composition, which is preferably parallel to the surface of the earth. The measurement angle of the pyrometer is aimed preferably at an acute angle to the composition surface to reduce unwanted interference by the heat coming from the infrared tubes.

BRIEF DESCRIPTION OF THE INVENTION

The invention will be explained below with the aid of embodiments represented in the drawings.

Figure 2:
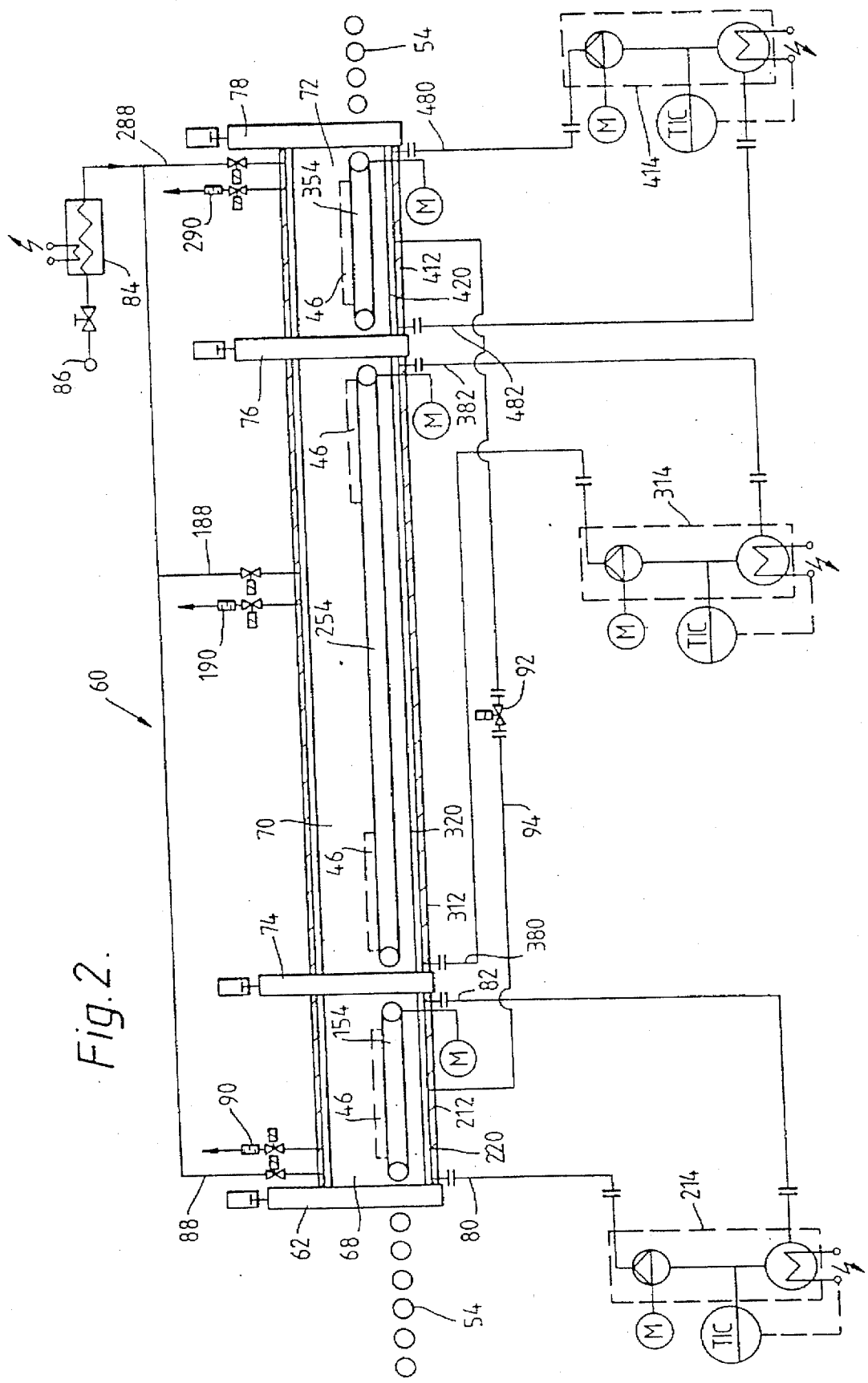
Figure 5:
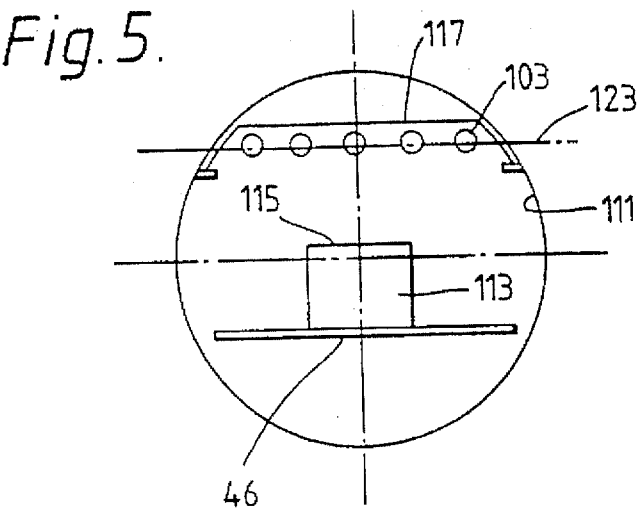
Figure 6:
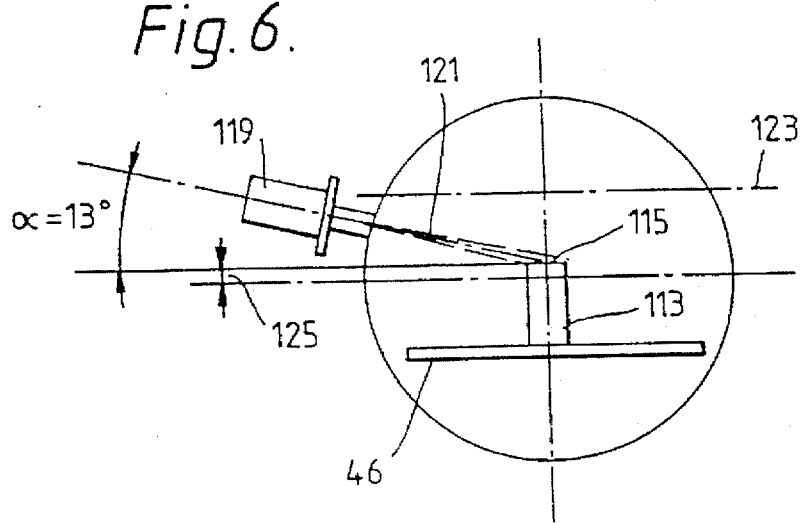

FIG. 1 schematically represents a holding tank for potting composition, connected at its outlet to a mixing and metering system, and, in section, the area leading into the tunnel oven;

FIG. 2 also schematically shows a tunnel oven configured according to the invention;

FIG. 3 shows a side view of a practical embodiment of the oven shown only schematically in FIG. 2, namely the forechamber and a portion of the main chamber, with an indication of the infrared heating system and pyrometer arrangement;

FIG. 4 a view from the left end of the oven according to FIG. 3, to explain the infrared heating system and pyrometer arrangement;

FIG. 5 a schematic representation of the oven cross section to explain the heating by infrared radiators;

FIG. 6 a view similar to that of FIG. 5 of the operation of the pyrometer, and

Figure 7:
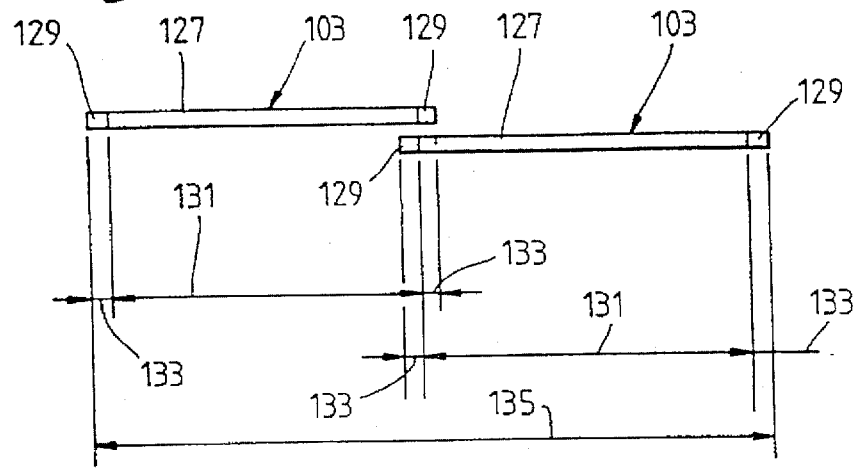

FIG. 7 a top view of the heating system to explain the arrangement of offset pairs of infrared radiation tubes.

PREFERRED EMBODIMENTS OF THE INVENTION

In FIG. 1 can be seen a holding tank 10 for potting composition, with thermal insulation 12 which forms between itself and the inner wall 18 a hollow jacket 20 having at its upper end an inlet flange 24 to permit temperature control fluid to pass through this jacket. By means of the flanges 22 and 24 a temperature control fluid circulating system 14 is connected, which has a heating means 16 for the fluid, plus a circulation pump 26 driven by a motor M. With the system 14 the temperature control fluid can be brought to a specific temperature and maintained thereat.

The holding tank 10 also includes a stirrer 28 driven by a motor M, as well as a motor driven metering pump 30 at its bottom discharge end, followed by a check valve 32 and an externally controlled three-way valve 34 which makes it possible to feed into a mixing means 38 the material coming from the holding tank and fed by the metering pump 30, or to feed it through another flange 40 into a collecting means (not shown here).

The valve systems 32 and 34 can likewise be connected to a temperature control system 114, for example, or also, with regard to the temperature control system 14, an electrically powered heater, and a control circuit which may consist of a temperature sensor and a system for controlling the heating system (indicated at "TIC").

The mixer 38 can also have a jacket with a hollow space 120 which can be connected through flange devices to a temperature control system 214, a control circuit again being indicated here, connected to an electrical heater; but cooling can also be performed, as indicated by the arrangement 40 for cooling water, for example.

By means of the mixer 38, which while mixing also produces static pressure, the material is driven to a casting valve 42 which can be carried along a pallet 46 by a conveyor means 44 powered by a motor M, in order to provide various components, arranged on this pallet but not shown here, with a metered amount of potting composition. The pallet 46 is shown in FIG. 1 inside of a potting chamber 28 [48!], which can be evacuated through a vacuum line 50.

The potting chamber 48 has an access gate 52, which can be raised pneumatically, for example, in order to move the pallet 46 into the potting chamber on appropriate conveyor means, such as roller conveyors or conveyor belts 54. Then the access gate 52 is closed again pneumatically, and then the potting chamber can be evacuated through line 50. After suitable metered amounts of the potting compound have been delivered into the individual components carried on the pallet 46, the potting chamber is vented, through the controlled venting valve 56 for example, and then the exit gate 58, which up to this point has been closed, can be opened, again pneumatically for example. With additional conveyor means similar to those indicated by reference number 54, the pallet can then be moved out of the potting chamber 48 and driven toward a tunnel oven 60, of which the entry gate 62 can be seen, which again can be operated pneumatically.

Just as the potting chamber 48 can be evacuated through a line 50, for example by a motor-powered vacuum pump 64 preceded and, if necessary, followed by systems for separating harmful substances, the holding tank 10 can also be evacuated through a vacuum line 150 which again can be connected to a vacuum pump 164 similar to the one with the reference number 64.

To fill the holding tank 10, the cover can be lifted off (first the vacuum is broken by venting valve 156) and the tank can be refilled. This, however, can also be performed through an access connection 66.

As it can be seen in FIG. 2, the conveyor system 54 carries the components filled with the potting compound (either individually or assembled on a pallet), through the access gate 62 into a tunnel oven 60 and also through this entire tunnel oven. As FIG. 2 clearly shows, the tunnel oven 60 consists of three separate treatment areas 68, 70 and 72, which are separated from one another by gates which again can be operated pneumatically and/or by closable partition walls 74, 76. The treatment chamber 72 is opened through an exit gate 78, from whence components or pallets leaving the oven 60 can be carried off by an appropriate conveyor means 54.

Each of the chambers 68, 70 and 72 has, again, hollow jackets 220, 320 and 420 around the chambers, and they in turn are closed off from the external environment by insulating layers 212, 312 and 412, respectively. The jackets 220 are, in a manner similar to that described in connection with the holding tank 10, connected to a system 214, 314 or 414, through flange-mounted connecting lines by which the jacket 220 can be filled with temperature control medium, such as temperature control liquid, preferably such that the temperature control medium is delivered in the vicinity of the entrance for pallets or components to be treated—see reference number 80—and carried away again—reference number 82—in order to be brought back to the correct temperature in system 214.

Chamber 68 of oven 60 is a so-called airlock entry chamber, in which the component to be treated (or a pallet of such components), at substantially the ambient temperature and pressure, is placed under elevated pressure, for example a pressure of 6 bar, after it enters and the gate 62 is closed (gate 74 is also closed), and at the same time the temperature is also raised to a suitable level, 80° C., for example. Since the temperature control system is connected at the entrance of the pallets—reference number 80—certain temperature gradients produced by the outwardly opening gate 62, are compensated.

The same applies also to the next chamber 70, which will be called the pressure chamber, and which has a greater length than the airlock entry chamber 68 which needs to hold only one pallet, while the main chamber 70 can accommodate several pallets, six of them for example. Throughout the entire treatment time this main chamber is subjected to a constant overpressure of, for example, 6 bar, and also to a substantially constant temperature determined by the heat control system 314. Here again it is desirable to feed the temperature control medium, e.g., the temperature control liquid at the entrance of this oven, i.e., in the area of the gated dividing wall 74—see reference No. 180—and to perform the withdrawal of the temperature control liquid 382 in the vicinity of the likewise gated additional dividing wall 76 at which the pallets exit after treatment. The higher temperature thus is situated at the entrance of the pallets or components, so that here a very rapid adaptation to the oven temperature is achieved due to the resultant temperature gradient.

Conversely, in the final chamber 72, the exit airlock chamber, it is desirable to deliver the temperature control liquid through the input 480 near the exit gate 78, but to remove the temperature control liquid near the dividing wall 76—see reference number 482. This in turn permits equalization of the stronger cooling that is due to the close proximity of the outside atmosphere near the gate 78, since the temperature of the inflowing temperature control medium is higher at 480 than it is at 482.

The ability to subject oven areas 68, 70 and 72 to an overpressure, is provided by compressed-air connections 88, 188 and 288, for example, whereby compressed air raised to temperature by means of a temperature control system 84 can be delivered to the individual chambers through a connection 86. The chambers can be vented through venting valves 90 and 290. As FIG. 2 furthermore shows, the components or pallets to be treated can be carried by holding and conveying means 154, 254 and 354 into the various chambers 68, 70 and 72 of the oven, hold them there for a set time, and bring them from there into the next oven chamber or bring them back out of the oven. The conveyor systems 154, 254 and 354 are driven by corresponding drives M.

To save energy (production and heating of compressed air) connecting line 94 containing a controlled valve device 92 is provided between chambers 68 and 72. In this manner it is possible to introduce the air or gas present in the exit airlock chamber under overpressure and at elevated temperature into the entry airlock chamber before the outlet airlock gate 78 opens, after a new pallet has been introduced into it and the gates 62 and 74 sealing the chamber have been closed (formerly the air contained in this chamber had to be discharged or vented in order to permit the pallets or components to be fed in). It is thus possible to exploit the thermal energy and pressure energy of the exit airlock chamber 72, which has to be vented anyway to remove the pallets or the components, and to use it for the purpose of delivering the heated air or gas that is available under pressure to the entry airlock chamber.

This passive unloading of pressure from the exit airlock chamber 72 into the entry airlock chamber 68 (or vice versa) is, of course, achievable only to the point where equal pressure prevails in both chambers, for example half of the pressure that was previously present in the exit airlock chamber (for example, 3 bar). The rest of the overpressure and the pressure energy thus present, as well as the thermal energy of the compressed gas, is then vented through valve 290 and is to that extent lost. The rest of the pressure in the forechamber 68 must then be provided through compressed air line 88.

These losses can be reduced, however, if one is willing to operate additional apparatus, for example by providing an active pump instead of valve 92, which will actively pump compressed air still present in the exit airlock chamber 72 from there into the entry airlock chamber 68, until the exit airlock chamber 72 returns to atmospheric pressure. Thus not only a great part of the pressure energy but also the thermal energy contained in the compressed gas is utilized.

The systems 214, 314 and 414 can, of course, also be used to produce pressure, instead of serving only for producing heat, as described above, in which case a connection could be made between chamber 220, 320 and 420 to a treatment chamber 68, 70 and 72.

The procedure would be somewhat as follows:

After gate 52 opens, single components, or preferably a pallet 46 with a larger number of components, is delivered via the conveyor system 54 into the potting chamber 48, the gate of which is closed; then the gate 52 is likewise closed and the potting chamber is evacuated through line 50. Then, by means of the motor-powered conveyor 54 within the casting chamber 48 (or by movement of the potting valve 44) the potting valve mouth is driven to the points on the pallet 46 or on the component at which the potting material is to be poured. This continues until all of the components arranged on the pallet 46 have been potted. Then the potting chamber 48 is vented through valve 56, gate 58 is opened, and the pallet 46 (or single components) are carried on the conveyor 54 to the gate 62 of the oven 60. After air is first removed through the valve 90, the gate 62 of oven 60 can be opened, whereupon the pallet 46 can be moved into the airlock forechamber 68. After gate 62 is closed (gate 74 continues to be closed) the chamber 68 is put under a specific overpressure, while at the same time the component or components become heated, since the chamber 68 is being heated by the compressed air or gas or, if desired, by the jacket 120 through which temperature control medium is flowing. As soon as the pressure in the main chamber 70 has also been reached in the forechamber 68, and also if desired after a certain temperature has been reached, the gate in the dividing wall 74 can be opened, and then the pallet 46 can be transported further on by the conveyor system 154 and 254. At the same time the gate in wall 76 will be held open at this juncture in order to pass another pallet 46, which is just at the end of the conveyor 254, from there into the exit airlock chamber 72, whose gate 78 at this time is closed.

Now the gates in dividing walls 74 and 76 are closed again, and the objects or pallets that have entered the exit airlock chamber 72 can be removed from it after it is vented through the venting valve 290 or venting line 94 and the gates 78 are opened; the conveyor 354, or the conveyor 54 situated outside of the oven, can be used for this purpose. Since the gate in the dividing wall is also closed at this time, the pressure can be relieved through the pressure unloading valve 90 or, alternatively, through line 94 into the exit lock chamber 72 (if its gate 78 has meantime been reclosed), and then gate 72 can be opened to receive into the forechamber 68 the next pallet which meantime has arrived at the oven with potted components. Now the gate 62 can be closed again, the forechamber 68 can be pressurized, the gate in dividing wall 74 can be opened, and the pallets can be introduced into the main oven chamber.

At the same time it may be better (although a cyclic separation is possible) to open gate 76 in order to transport another (additional) pallet 46 from the main chamber 70 into the exit airlock chamber 72, as already described.

The main oven chamber 70 can best have a relatively great length so that several pallets can be treated simultaneously. The number of pallets (or individual components) that can be treated simultaneously depends on the total treatment time required for curing the potting compound, and on the cyclic period at which the pallets are introduced into the forechamber 68 and removed from the exit chamber. The shorter these cycles are and the longer the treatment time in the main oven chamber 70 is, the more pallets this chamber 70 should be able to accommodate.

In a practical embodiment it has proven desirable to be able to accommodate six pallets in the main oven chamber 70.

Infrared radiators can be used in an especially advantageous manner as heating devices in the curing oven. FIG. 3 shows, in a view similar to the left half of FIG. 2, the first airlock chamber and the beginning of the second airlock chamber of a drying oven which is equipped with infrared heating systems, while FIG. 4 shows a view from the left end of the system represented in FIG. 3. FIGS. 3 and 4 show a practical embodiment, while FIG. 2 is essentially a schematic representation.

Important in these figures is a heating system 107 at the entrance to treatment chamber 70. This heating system 107 consists of a plurality of quartz tubes arranged parallel to one another and to the oven axis 101, which are held, for example, by supports 105 which in turn are supported on projections 109 extending from the inner oven wall 111. FIG. 5 shows in a view similar to FIG. 4, but schematically, the passageway with the inner wall 111 of the treatment chamber 70, in which an object to be potted, such as a horizontal output transformer, is held on a pallet 46 or other bearing surface. This object 113 has at least one surface 115 at which the compound to be cured can be struck by the infrared light emitted by the infrared radiator 103. This surface 115 is preferably a bare surface of the compound to be cured, i.e., a substantially horizontal (parallel to the floor) liquid surface, although it can be a differently oriented, e.g., vertical, surface if this liquid is formed by a solid object wall that is permeable to infrared light. In this case the infrared radiators 103 might also be mounted laterally on the oven wall 111.

Above the infrared radiator 103 a shielding surface 117 can be seen in FIG. 5, which can be made reflective in order to return upwardly radiated infrared light back down onto the surface 115.

By means of the infrared radiator system thus far described (instead of or in addition to a hot-air heating system, for example), a surface of the material to be cured that faces the infrared radiation source can be heated in substantially less time to a desired temperature and held at this temperature as needed. To permit precise control of the temperature of the surface layer of the compound being cured and which is exposed to the infrared radiation, since exceeding the maximum acceptable temperature of the component can result from excessive energy input on account of the violet exothermic reaction of the compound being cured, resulting in the damaging or destruction of the component, it is desirable for the source of the infrared radiation to have a very fast response time and also to be very quickly correctable. Sources of long-wavelength infrared radiation are not so very suitable for this purpose, but sources of short-wavelength infrared radiation are highly suitable. The temperature to which the irradiated surface of the potting resin compound has to be heated before the infrared source is turned off again depends on several factors, such as the maximum heat that can be tolerated by the component, the quantity of the potting resin, the thickness of the potting layer enveloping the component, and thus substantially the geometry of the component to be potted. After the necessary temperature has been reached the gelling proceeds by itself due to the chemical reaction of the potting resin.

This has the advantage that the overall process time can be reduced in comparison to hot-air heating, without exceeding the maximum temperature of the potting compound. The working time of the infrared radiation that will result in the desired optimum temperature for the particular component can be determined by experiment, and can then be held constant for similar components.

It is still better to measure the temperature reached on this surface by convection and/or by short-wavelength infrared radiation, which can be done most simply by so-called "contactless" pyrometers. Such a pyrometer is installed laterally in the oven wall in FIG. 6, and is provided with reference number 119. The pyrometer 119 has a sensing beam 121 with an angle of incidence α that is just sufficient to cover the surface 115 of the object 113, the sensing beam being so aimed that other areas of the object 113 which are also heated will remain masked out insofar as possible. The pyrometer 199 is preferably mounted below the plane 123 on which the infrared radiators 103 are disposed, while the beam 121 is aimed at this surface at an acute angle α amounting, for example, to 13°, which has the advantage that light emitted directly from the heat radiators 103 or reflected from the object 113 will not result in interference within the pyrometer 119, so that the latter will cover only the surface to be measured by the thermal radiation. The surface 115, in the embodiment represented in FIGS. 5 and 6, is disposed at a level 125 above the oven axis 101. This level on the one hand affects the distance from the heat radiators 103, and on the other hand it also determines the setting of the pyrometer 119.

The pyrometer 119 (two shown in FIG. 3) can be connected by a control means, a microprocessor for example, to the power supply for the infrared radiator 103 such that the infrared radiators will be turned on for such a period of time (e.g., a few seconds) that the desired temperature in the surface layer of the potting compound will barely be reached and held thereat as needed. In this manner the energy carried by thermal conduction into the interior of the component can also be quickly adjusted. There are some highly active, cationically reactive resin systems in which the heating time determines the cycle time. The accelerated heating by means of the above-described infrared heating process, controlled if desired by a pyrometer, can therefore appreciably accelerate the operation of the system. On the other hand, the possible convection heating is substantially slower and in this respect less than optimal.

In FIG. 3, two pyrometers 119 are provided, disposed in tandem in the direction in which the objects to be cured are moving, and for each pyrometer a set of quartz tubes 103 is provided, which are controlled separately by the corresponding pyrometers. FIG. 7 is a plan view of the arrangement of these two sets of quartz tubes 103 which are offset from one another such that the active, i.e., radiating areas 127 of the tubes 103 are seamlessly adjoined to one another, while the nonradiating areas 129 (substantially the bases of the tubes) reach into the ranges of the radiating areas 127; in the practical embodiment the length 131 could amount, for example, to 420 mm, and the length 133 to 40 to 60 mm. The total length of the system—see reference number 135—will amount, say, to about 1 meter. This length suffices to heat common components reliably to the temperature that triggers the exothermic reaction and curing of the compound.

INDUSTRIAL UTILITY

The described method and the described apparatus is industrially usable, for example in the electronics industry.

We claim:

1. Method of potting and subsequent curing of one or a plurality of components with an impregnating composition which does not cure at room temperature, but cures within less than 30 minutes at a temperature above 60° C., comprising the steps of:
   a) Introducing a component or a pallet of a plurality of components into a potting chamber,
   b) Evacuating the potting chamber,
   c) Potting said component or plurality of components in the composition under vacuum,
   d) Venting the potting chamber,
   e) Removing said component or plurality of components and placing them in an airlock forechamber of a curing oven having an airlock forechamber, a main chamber and an airlock exit chamber,
   f) Closing the curing oven airlock forechamber and evacuating it,
   g) Opening said airlock forechamber to the oven main chamber, introducing the component or plurality of components into said main chamber, and then closing said main chamber,
   h) Passing the component or plurality of components through the oven main chamber,
   i) Opening the oven main chamber to the oven airlock exit chamber and passing the component or plurality of components out of the oven main chamber into the oven airlock exit chamber and closing the oven airlock exit chamber,
   j) Venting the oven airlock exit chamber and removing the component or plurality of components from the oven airlock exit chamber.

2. Method of claim 1, wherein the potting is performed by means of a heated, expulsion producing mixer which heats the composition to approximately the temperature at which said composition begins to cure, and feeds said heated composition to the component or components to be potted.

3. Method of claim 2, wherein air vented from the airlock chambers is recirculated.

4. Method of claim 1, wherein the passage of said one or plurality of components through the oven main chamber is synchronized with the passage of same through the airlock forechamber and the airlock exit chamber.

5. Method of claim 4, further including the step of heating and recirculating a gas within the chamber.

6. Apparatus for potting and subsequently curing one or a plurality of components with an impregnating composition, comprising a holding tank for the potting composition, said holding tank having an outlet for said potting composition, a potting chamber, said potting chamber being a single chamber or three chambers separated from each other by dividing walls, said three chambers being a forechamber for entry through an airlock, a main chamber and an airlock exit chamber; a tunnel oven and conveyor means for conveying said component or plurality of components out of the potting chamber, into the tunnel oven and through the tunnel oven; and means for feeding potting composition from said holding tank into said potting chamber.

7. Apparatus according to claim 6, wherein the tunnel oven comprises three chambers: an oven entry airlock chamber, an oven main chamber, and an oven exit airlock chamber.

8. Apparatus according to claim 7, wherein the oven entry airlock chamber and oven exit airlock chamber are connected with one another by means of pressure line means which enables venting of either chamber into the other.

9. Apparatus according to claim 8, wherein said pressure line connecting the airlock chambers with one another comprises a pumping device that pumps air contained in one of the airlock chambers into the other airlock chamber.

10. Apparatus according to claim 9, wherein the individual oven chambers are connected with heating devices to maintain the chamber walls at a set temperature.

11. Apparatus according to claim 10, wherein the heating devices comprise hollow spaces enveloping the chamber walls, which hollow spaces are provided with a heating medium.

12. Apparatus according to claim 6, wherein said tunnel oven includes infrared radiators.

13. Apparatus according to claim 12, said tunnel oven further comprising a pyrometer for measuring the surface temperature of said components as they pass through the tunnel oven.

14. Apparatus according to claim 13, wherein the infrared radiator and the pyrometer are connected by way of a control device, to a control circuit which controls the amount of heat applied to the surface of the component.

15. Apparatus according to claim 14, wherein the infrared radiators comprise a plurality of quartz tubes disposed side by side, each coaxial to the oven axis, whereby the surface spanned by the quartz tubes axes is substantially parallel to and at a distance from the surface of the composition to be cured.

16. Apparatus according to claim 15, wherein the measuring angle of the pyrometer points at an acute angle to the surface of the component.

* * * * *